United States Patent
Morgan

(10) Patent No.: US 9,352,621 B2
(45) Date of Patent: May 31, 2016

(54) TIRE INFLATION SYSTEM HAVING A PRESSURE RELIEF VALVE

(71) Applicant: ArvinMeritor Technology, LLC, Troy, MI (US)

(72) Inventor: John D. Morgan, Medina, OH (US)

(73) Assignee: ArvinMeritor Technology, LLC, Troy, MI (US)

( * ) Notice: Subject to any disclaimer, the term of this patent is extended or adjusted under 35 U.S.C. 154(b) by 10 days.

(21) Appl. No.: 14/331,736

(22) Filed: Jul. 15, 2014

(65) Prior Publication Data

US 2016/0016443 A1    Jan. 21, 2016

(51) Int. Cl.
*B60C 23/00* (2006.01)

(52) U.S. Cl.
CPC .................................... *B60C 23/003* (2013.01)

(58) Field of Classification Search
CPC .... B60C 23/00; B60C 23/001; B60C 23/003; B60C 23/004
USPC ................................................ 152/415–417
See application file for complete search history.

(56) References Cited

U.S. PATENT DOCUMENTS

| | | | | |
|---|---|---|---|---|
| 4,067,376 A | * | 1/1978 | Barabino | 152/418 |
| 4,431,043 A | * | 2/1984 | Goodell et al. | 152/417 |
| 4,440,451 A | * | 4/1984 | Goodell et al. | 301/105.1 |
| 4,470,506 A | * | 9/1984 | Goodell et al. | 206/223 |
| 4,696,334 A | * | 9/1987 | le Chatelier et al. | 152/417 |
| 4,705,090 A | * | 11/1987 | Bartos | 152/417 |
| 4,733,707 A | * | 3/1988 | Goodell et al. | 152/417 |
| 4,883,106 A | * | 11/1989 | Schultz et al. | 152/417 |
| 5,094,263 A | * | 3/1992 | Hurrell et al. | 137/224 |
| 5,119,856 A | * | 6/1992 | Zarotti | 152/415 |
| 6,601,625 B2 | * | 8/2003 | Rheinhardt | 152/418 |
| 6,994,136 B2 | | 2/2006 | Stanczak | |
| 7,207,365 B2 | * | 4/2007 | Nelson et al. | 152/417 |
| 7,931,061 B2 | | 4/2011 | Gonska et al. | |
| 8,052,400 B2 | * | 11/2011 | Isono | 417/233 |
| 8,223,006 B2 | * | 7/2012 | Wilson et al. | 340/449 |
| 8,371,350 B2 | * | 2/2013 | Collet et al. | 152/417 |
| 9,104,209 B2 | * | 8/2015 | Colussi et al. | |
| 2005/0205182 A1 | * | 9/2005 | Maquaire et al. | 152/417 |
| 2008/0127773 A1 | * | 6/2008 | Solie et al. | 74/606 A |
| 2009/0009310 A1 | * | 1/2009 | Caretta et al. | 340/442 |
| 2009/0101261 A1 | * | 4/2009 | Collet et al. | 152/417 |

(Continued)

FOREIGN PATENT DOCUMENTS

FR          1589897 A       4/1970
WO     2011163274 A2      12/2011

(Continued)

OTHER PUBLICATIONS

Meritor, an ArvinMeritor brand, Meritor Tire Inflation System (MTIS) by PSI Trademark including Meritor ThermALERT Trademark, PB-9999, Revised May 2007.

(Continued)

*Primary Examiner* — Hau Phan
*Assistant Examiner* — Jacob Meyer
(74) *Attorney, Agent, or Firm* — Brooks Kushman P.C.

(57) ABSTRACT

A tire inflation system for a vehicle. The tire inflation system may include at least one pressure relief valve. The pressure relief valve may be normally closed and may be configured to vent pressurized gas from a tire when a pressure of the pressurized gas in the tire exceeds a threshold pressure.

19 Claims, 2 Drawing Sheets

(56) References Cited

U.S. PATENT DOCUMENTS

| | | | |
|---|---|---|---|
| 2009/0283190 A1* | 11/2009 | Padula et al. | 152/417 |
| 2009/0311112 A1* | 12/2009 | Isono | 417/233 |
| 2010/0096057 A1* | 4/2010 | Wilson | 152/416 |
| 2010/0181739 A1* | 7/2010 | Eschenburg et al. | 280/124.125 |
| 2011/0162773 A1* | 7/2011 | Gonska et al. | 152/418 |
| 2011/0204705 A1* | 8/2011 | Collet et al. | 301/5.24 |
| 2012/0186714 A1 | 7/2012 | Richardson | |
| 2012/0234447 A1* | 9/2012 | Narloch et al. | 152/418 |
| 2013/0228258 A1* | 9/2013 | Knapke et al. | 152/415 |
| 2014/0261941 A1* | 9/2014 | Knapke et al. | 152/417 |
| 2015/0007920 A1* | 1/2015 | Tanno | 152/416 |
| 2015/0013866 A1* | 1/2015 | Tanno | 152/417 |
| 2015/0047764 A1* | 2/2015 | Tiziani et al. | 152/417 |
| 2015/0059945 A1* | 3/2015 | Flory et al. | 152/417 |
| 2015/0059946 A1* | 3/2015 | Keeney et al. | 152/417 |
| 2015/0059947 A1* | 3/2015 | Power et al. | 152/419 |
| 2015/0068654 A1* | 3/2015 | Lewandowski et al. | 152/419 |
| 2015/0075688 A1* | 3/2015 | Keeney et al. | 152/417 |
| 2015/0096656 A1* | 4/2015 | Polubinski et al. | 152/419 |
| 2015/0101722 A1* | 4/2015 | Lakin et al. | 152/417 |
| 2015/0101723 A1* | 4/2015 | Keeney et al. | 152/423 |
| 2015/0197124 A1* | 7/2015 | Sonzala et al. | |
| 2015/0203032 A1* | 7/2015 | Honig et al. | |
| 2015/0231937 A1* | 8/2015 | Holdrich et al. | |
| 2015/0273958 A1* | 10/2015 | Stoychev et al. | |
| 2015/0290986 A1* | 10/2015 | Tsiberidis | |

FOREIGN PATENT DOCUMENTS

| | | |
|---|---|---|
| WO | 2012027335 A1 | 3/2012 |
| WO | 2013125409 A1 | 8/2013 |

OTHER PUBLICATIONS

European Patent Office, Extended European Search Report for corresponding European Patent Application Nb. 15164554.6 dated Feb. 1, 2016.

Circle Seal Controls, 500 Series Adjustable Popoff & Inline Relief Valves 0.5 to 150 psig (10 bar), publication date unknown, Circle Seal Controls, Corona, CA, www.circlesealcontrols.com.

Generant, Series VRV Vent Relief Valve, publication date unknown, Generant, Butler, NJ 07405.

Hendrickson USA, LLC, TIREMAAX Automatic Tire Inflation Systems, Rev F 01-15, Hendrickson USA, L.L.C.

Hendrickson USA, LLC, Technical Procedure TIREMAAX CP Tire Inflation System Systems, Feb. 2012, Revision A, Hendrickson USA, L.L.C.

* cited by examiner

TIRE INFLATION SYSTEM HAVING A PRESSURE RELIEF VALVE

TECHNICAL FIELD

This patent application relates to a tire inflation system in which pressurized gas may be vented via a pressure relief valve.

BACKGROUND

A tire inflation system is disclosed in U.S. Pat. No. 7,931, 061.

SUMMARY

In at least one embodiment, a tire inflation system is provided. The tire inflation system may include a tube assembly that may provide pressurized gas to a tire. The tube assembly may have a tube, a first fitting, a second fitting, and a pressure relief valve. The tube may have a first end and a second end. The first fitting may be disposed proximate the first end and may have a first port, a second port, and a third port. The first port may receive pressurized gas. The second port may provide pressurized gas to the tube. The third port may be fluidly connected to the first port. The second fitting may be disposed proximate the second end of the tube and may be coupled to a tire valve. The pressure relief valve may be fluidly connected to the third port. The pressure relief valve may vent pressurized gas from the tire when a pressure of the pressurized gas in the tire exceeds a threshold pressure.

In at least one embodiment, a tire inflation system is provided. The tire inflation system may include a pressurized gas source and a wheel. The pressurized gas source may supply pressurized gas to a tire that may be mounted on the wheel. The wheel may include a first opening, a second opening, and a wheel pressure relief valve. The first opening may receive pressurized gas from the pressurized gas source. The wheel pressure relief valve may be disposed proximate the second opening. The wheel pressure relief valve may open to vent pressurized gas from inside the tire to the surrounding environment when a pressure of pressurized gas in the tire exceeds a threshold pressure.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
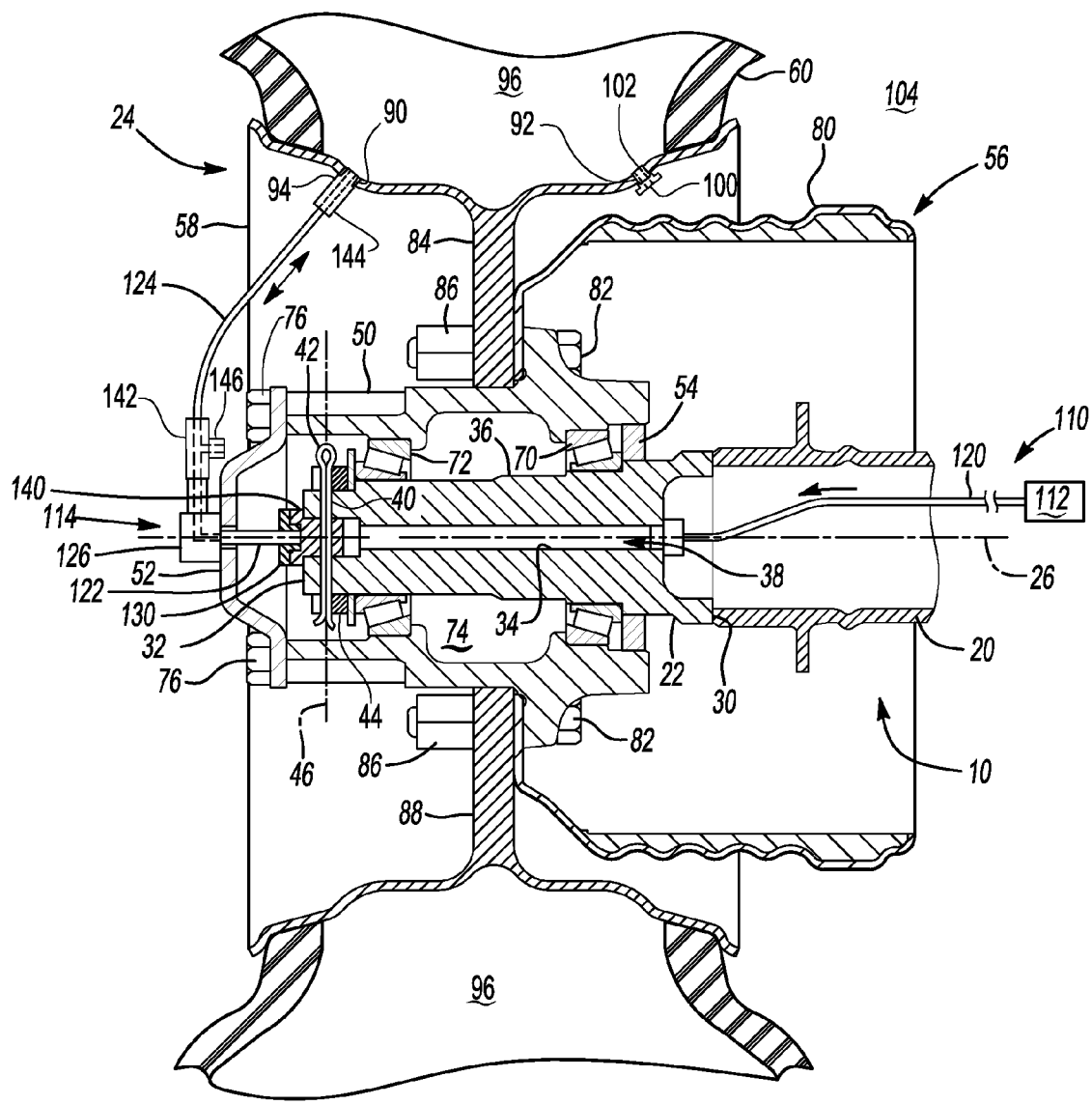
FIG. 1 is a section view of a wheel end assembly and a tire inflation system.

Referring to FIG. 1, a portion of an exemplary axle assembly 10 is shown. The axle assembly 10 may be provided with a motor vehicle like a truck, bus, farm equipment, military transport or weaponry vehicle, or cargo loading equipment for land, air, or marine vessels, or a trailer that may be provided with a motor vehicle.

The axle assembly 10 may facilitate mounting of one or more wheels to the vehicle and may or may not be steerable. The axle assembly 10 may be configured as a drive axle or a non-drive axle. In a drive axle configuration, the axle assembly 10 may receive torque from a power source, such as an internal combustion engine or an electric motor that may be used to propel the vehicle. In a non-drive axle configuration, the axle assembly 10 may not receive torque from a power source. In FIG. 1, the axle assembly 10 is shown with a non-drive axle configuration that may include an axle housing 20, a spindle 22, and a wheel end assembly 24.

The axle housing 20 may receive or support various components of the axle assembly 10. In addition, the axle housing 20 may facilitate mounting of the axle assembly 10 to the vehicle.

The spindle 22 may be provided with or may be fixedly positioned with respect to the axle assembly 10. In a steerable configuration, the spindle 22 may be provided with or may be fixedly positioned with respect to a steering knuckle rather than the axle housing 20. The spindle 22 may generally extend along but may not rotate about an axis 26. In at least one embodiment, the spindle 22 may include a first spindle end surface 30, a second spindle end surface 32, an internal surface 34, an external surface 36, a spindle passage 38, and a spindle fastener hole 40.

The first spindle end surface 30 may be disposed proximate or may engage the axle housing 20. Alternatively, the first spindle end surface 30 may be omitted in a configuration in which the spindle 22 is integrally formed with the axle housing 20 or is not provided as a separate component. The second spindle end surface 32 may be disposed opposite the first spindle end surface 30.

The internal surface 34 may extend between the first spindle end surface 30 and the second spindle end surface 32 and may at least partially define the spindle passage 38. In at least one embodiment, pressurized gas for inflating a tire may flow through the spindle passage 38. For example, the spindle passage 38 may define a conduit that receives pressurized gas or the spindle passage 38 may receive a conduit, such as a hose, tubing or the like that may receive pressurized gas and that may extend at least partially through the spindle passage 38.

The external surface 36 may be disposed opposite the internal surface 34. The external surface 36 of the spindle 22 may support one or more wheel bearings that may rotatably support the wheel end assembly 24 as will be discussed in more detail below.

The spindle fastener hole 40, if provided, may be configured to receive a fastener 42, such as a cotter pin, that may optionally be provided to help secure or inhibit movement of a spindle nut 44 that may be disposed on the spindle 22. A fastener 42 such as a cotter pin is optional may be omitted in one or more embodiments. The spindle nut 44 may help retain a bearing and inhibit axial movement of the wheel end assembly 24. The spindle fastener hole 40 may extend along a spindle fastener hole axis 46. The spindle fastener hole axis 46 may intersect and may be disposed substantially perpendicular to the axis 26 in one or more embodiments. The spindle fastener hole 40 may intersect the spindle passage 38 and may extend completely through the spindle 22 such that the spindle passage 38 may separate or bisect the spindle fastener hole 40.

The wheel end assembly 24 may be rotatably disposed on the spindle 22. In at least one embodiment, the wheel end assembly 24 may include a hub 50, a hub cap 52, wheel end seal assembly 54, a brake subsystem 56, a wheel 58, and a tire 60.

The hub 50 may be rotatably disposed on the spindle 22 and may be configured to rotate about the axis 26. For instance, one or more wheel bearings may be mounted on spindle 22 and may rotatably support the hub 50. In FIG. 1, a first wheel bearing 70 and a second wheel bearing 72 are provided in a cavity 74 that is located between the spindle 22 and the hub 50. The first wheel bearing 70 may be disposed inboard or further from the second spindle end surface 32 than the second wheel bearing 72.

The hub cap 52 may cover and help conceal components of the wheel end assembly 24. The hub cap 52 may be coupled to the hub 50 with one or more fasteners 76 such as bolts. As such, the hub cap 52 may rotate with the hub 50.

The wheel end seal assembly 54 may be disposed between the spindle 22 and the hub 50. The wheel end seal assembly 54 may inhibit contaminants from entering the cavity 74 and may help retain lubricant in the cavity 74. In at least one embodiment, the wheel end seal assembly 54 may be fixedly disposed with respect to the hub 50 and may rotate about the axis 26 and with respect to the spindle 22. Alternatively, the wheel end seal assembly 54 may be fixedly disposed with respect to the spindle 22 and the hub 50 may rotate about the axis 26 and with respect to the wheel end seal assembly 54.

The brake subsystem 56 may be adapted to slow or inhibit rotation of at least one associated wheel 58. For example, the brake subsystem 56 may be configured as a friction brake, such as a drum brake or a disc brake. In FIG. 1, a portion of the brake subsystem 56 is shown with a drum brake configuration. In a drum brake configuration, a brake drum 80 may be fixedly disposed on the hub 50 with one or more fasteners 82, such as wheel lug studs. The brake drum 80 may extend continuously around brake shoe assemblies (not shown) that may be configured to engage the brake drum 80 to slow rotation of an associated wheel 58.

The wheel 58, which may also be called a wheel rim, may be configured to support and facilitate mounting of an associated tire 60. The tire 60 may be a pneumatic tire that may be inflated with a pressurized gas or pressurized gas mixture.

The wheel 58 may be fixedly positioned with respect to the hub 50. For example, the wheel 58 may have a wheel mounting flange 84 that may have a set of holes that may each receive a fastener 82 that may help mount on the wheel 58 to the hub 50. A lug nut 86 may be threaded onto each fastener 82 to secure the wheel 58 to the hub 50. The lug nut 86 may engage or may be disposed proximate an outboard side 88 of the wheel mounting flange 84 that may face away from the brake drum 80 or toward the hub cap 52. The wheel 58 may also include a first opening 90 and/or a second opening 92.

The first opening 90 may be configured to receive pressurized gas from a tire inflation system as will be discussed in more detail below. For example, the first opening 90 may receive a tire valve 94 that may be configured to allow pressurized gas to enter the tire 60, or more specifically to enter a cavity 96 that may be disposed between the wheel 58 and an associated tire 60. The tire valve 94 may have any suitable configuration. For instance, the tire valve 94 may be configured as a Schrader valve that may be configured to move between an open position and a closed position. In the open position, pressurized gas may enter or exit the cavity 96 via the tire valve 94. In the closed position, pressurized gas may be inhibited from entering or exiting the cavity 96 via the tire valve 94.

The second opening 92, if provided, may be a through hole that may extend through the wheel 58 to the cavity 96. The second opening 92 may be spaced apart from the first opening 90. In at least one embodiment, the second opening 92 may be disposed on an opposite side of the wheel mounting flange 84 from the first opening 90. For example, the second opening 92 may face inboard or toward the brake drum 80 to help shield components that are disposed in our associated with the second opening 92 from contaminants or damage. A wheel pressure relief valve 100 and optionally an intermediate wheel valve 102 may be associated with the second opening 92.

The wheel pressure relief valve 100 may be disposed proximate the second opening 92. The wheel pressure relief valve 100 may be of any suitable type. For example, the wheel pressure relief valve 100 may have a preset or adjustable threshold pressure at which the wheel pressure relief valve 100 may open. The wheel pressure relief valve 100 may open to vent pressurized gas from inside the tire 60 or from the cavity 96 to the surrounding environment 104 when the pressure of the pressurized gas in the cavity 96 exceeds a threshold pressure. For instance, the threshold pressure may be greater than or equal to a desired or target tire inflation pressure in one or more embodiments and may account for tolerances associated with the valve design or a pressure range at which the wheel pressure relief valve 100 may open. The pressure of pressurized gas inside the cavity 96 may exceed the threshold pressure when the tire 60 is overinflated or the pressure inside the tire 60 increases due to increased temperature. The wheel pressure relief valve 100 may vent pressurized gas from the cavity 96 or from inside the tire 60 to the surrounding environment when pressurized gas is being provided to the cavity 96 via the first opening 90 and/or when pressurized gas is not being provided to the cavity 96. The wheel pressure relief valve 100 may be closed when the pressure of pressurized gas in the cavity 96 does not exceed the threshold pressure. As such, the wheel pressure relief valve 100 may not permit pressurized gas to enter or exit the cavity 96 via the second opening 92 when the wheel pressure relief valve 100 is closed. The wheel pressure relief valve 100 may be disposed proximate and may extend through the second opening 92 when an intermediate wheel valve 102 is not provided.

The intermediate wheel valve 102, if provided, may be disposed between the second opening 92 and the wheel pressure relief valve 100. For example, the intermediate wheel valve 102 may be disposed proximate the second opening 92 or may be received in the second opening 92. The intermediate wheel valve 102 may control the flow of gas from the cavity 96 depending on whether the wheel pressure relief valve 100 is present. For example, the intermediate wheel valve 102 may move between an open position and a closed position. In the open position, pressurized gas may flow from the cavity 96 through the intermediate wheel valve 102 and to the wheel pressure relief valve 100. In the closed position, pressurized gas may not flow from the cavity 96 through the intermediate wheel valve 102. The intermediate wheel valve 102 may be held in the open position by the wheel pressure relief valve 100. For example, the wheel pressure relief valve 100 may actuate a valve stem of the intermediate wheel valve 102 and hold the valve stem in an open position when the wheel pressure relief valve 100 is mounted to the intermediate wheel valve 102. Removal of the wheel pressure relief valve 100 from the intermediate wheel valve 102 may allow the valve stem to move to a closed position to inhibit pressurized gas from flowing through the intermediate wheel valve 102. For instance, the valve stem may move axially such that an enlarged head at the end of the valve stem that is disposed opposite the wheel pressure relief valve 100 seals against the body of the intermediate wheel valve 102. As such, the intermediate wheel valve 102 may be open when the wheel pressure relief valve 100 is mounted to the intermediate wheel valve 102 and the intermediate wheel valve 102 may be closed when the wheel pressure relief valve 100 is not mounted to the intermediate wheel valve 102.

A tire inflation system 110 may be associated with the wheel end assembly 24. The tire inflation system 110 may be disposed on the vehicle and may be configured to provide a pressurized gas or pressurized gas mixture to one or more tires 60. For clarity, the term "pressurized gas" may refer to either a pressurized gas or a pressurized gas mixture. The tire inflation system 110 may include a control system that may monitor and control the inflation of one or more tires 60, a pressurized gas source 112, and a gas supply subsystem 114.

The pressurized gas source 112 may be configured to supply or store a volume of a pressurized gas or pressurized gas mixture, like air or nitrogen. For example, the pressurized gas source 112 may be a tank and/or a pump like a compressor. The pressurized gas source 112 may be disposed on the vehicle and may provide a pressurized gas or pressurized gas mixture at a pressure that is greater than or equal to a desired inflation pressure of a tire 60. As such, the pressurized gas source 112 may inflate a tire or maintain a desired tire pressure.

The gas supply subsystem 114 may fluidly connect the pressurized gas source 112 to the tire 60. The gas supply subsystem 114 may include one or more conduits, such as a hose, tubing, pipe, or combinations thereof. The routing of the conduits between the pressurized gas source 112 and a tire 60 that is shown in FIG. 1 is exemplary and is not meant to be limiting as other conduit routing paths may be provided. The flow of pressurized gas is represented by the arrows located near the conduits in FIG. 1.

The gas supply subsystem 114 may be provided in various configurations. In the embodiment shown in FIG. 1, the gas supply subsystem 114 routes pressurized gas from the pressurized gas source 112 through a spindle passage 38 that generally extends the length of the spindle 22. Alternatively, the spindle passage 38 may not extend the length of the spindle 22 and may be fluidly connected to a passage in the hub 50. In addition, pressurized gas may not be routed through the spindle 22 in one or more embodiments. In at least one embodiment such as that shown in FIG. 1, the gas supply subsystem 114 may include a first conduit 120, a connection conduit 122, and a tube assembly 124.

The first conduit 120 may receive pressurized gas from the pressurized gas source 112 and may fluidly connect the pressurized gas source 112 to the spindle passage 38.

The connection conduit 122 may receive pressurized gas from the spindle passage 38 and may supply pressurized gas to the tube assembly 124. For example, the connection conduit 122 may be disposed proximate or extend through a hole in the hub cap 52 and may be connected to the tube assembly 124 via a rotary fitting 126. The rotary fitting 126 may be configured to rotate with respect to the connection conduit 122 and/or with respect to the hub cap 52.

A connection fitting 130 may help interconnect the spindle passage 38 and the connection conduit 122. The connection fitting 130 may receive pressurized gas from the spindle passage 38 and inhibit leakage to the surrounding environment 104. For example, the connection fitting 130 may be configured to allow gas to flow around the fastener 42, if provided, such that pressurized gas may flow from the spindle passage 38 to the rotary fitting 126 via connection conduit 122 without exiting the connection fitting 130 via a hole in the connection fitting 130 that may receive the fastener 42.

Figure 2:
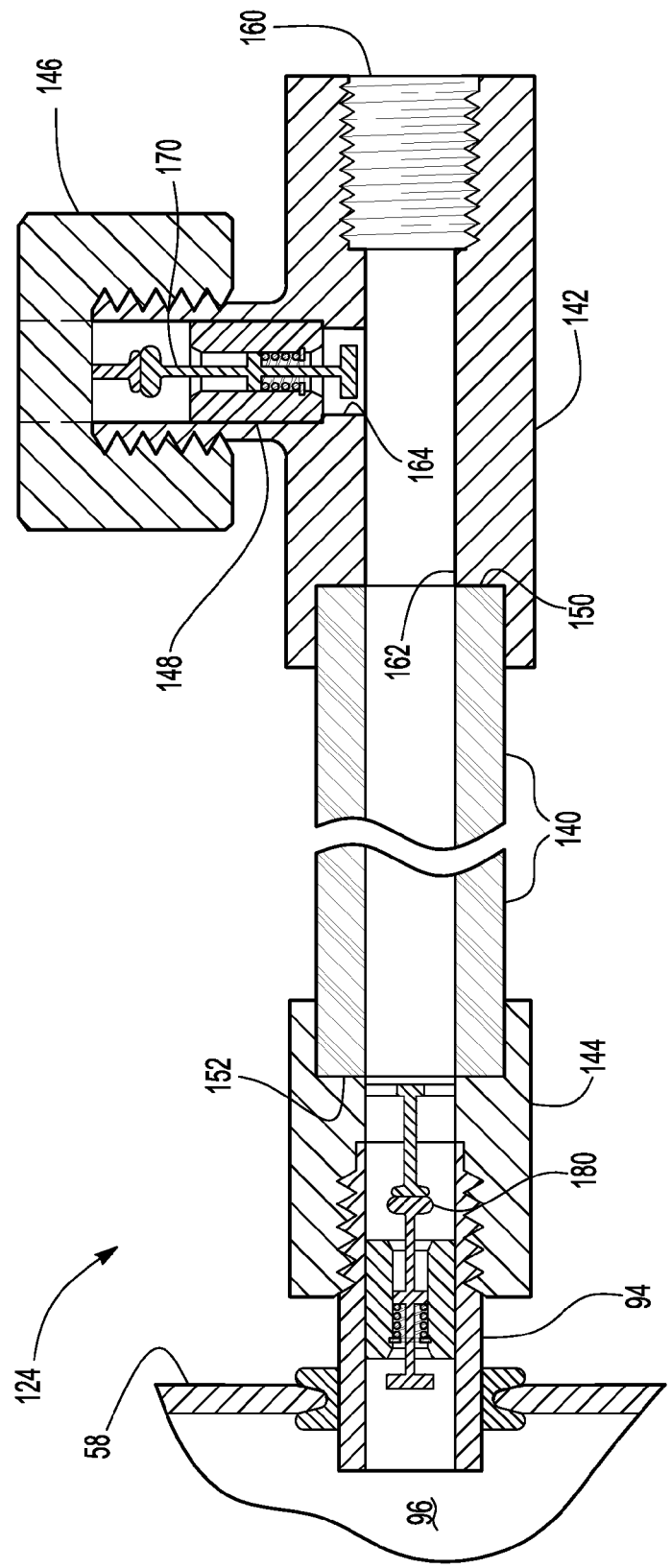
FIG. 2 is a section view of a tube assembly that may be provided with the tire inflation system.

The tube assembly 124 may receive pressurized gas from the pressurized gas source 112 and the gas supply subsystem 114. For instance, the tube assembly 124 may receive pressurized gas from the connection conduit 122. The tube assembly 124 may also provide pressurized gas to a tire 60. More specifically, the tube assembly 124 may receive pressurized gas from the pressurized gas source 112 and may provide pressurized gas to the cavity 96 of the tire 60 via the tire valve 94. The tube assembly 124 may be provided in various configurations. In at least one embodiment, the tube assembly 124 may include a tube 140, a first fitting 142, a second fitting 144, a pressure relief valve 146, and an intermediate valve 148 as is best shown in FIG. 2.

The tube 140 may have a tubular configuration and may be configured to route or transport pressurized gas to the tire valve 94. The tube 140 may be configured as a hose, tubing, or the like and may be rigid, flexible, or combinations thereof. The tube 140 may have a first end 150 and a second end 152. The second end 152 may be disposed opposite the first end 150.

The first fitting 142 may be disposed proximate the first end 150 of the tube 140. In at least one embodiment, the first fitting 142 may have a first port 160, a second port 162, and a third port 164.

The first port 160 may receive pressurized gas from the tire inflation system 110. For example, the first port 160 may be coupled to the rotary fitting 126.

The second port 162 may be fluidly connected to the first port 160. The second port 162 may route pressurized gas to the tube 140 when pressurized gas is provided to the first port 160 under sufficient pressure.

The third port 164 may also be fluidly connected to the first port 160. In addition, the third port 164 may be spaced apart from the second port 162. The third port 164 may route pressurized gas to the pressure relief valve 146 and the intermediate valve 148, if provided.

The second fitting 144 may be disposed proximate the second end 152 of the tube 140. In at least one embodiment, the second fitting 144 may be coupled to the tire valve 94 to provide pressurized gas to the tire 60.

The second fitting 144 may be configured to hold the tire valve 94 in an open position when the second fitting 144 is coupled to the tire valve 94. For example, the second fitting 144 may actuate a valve stem 180 of the tire valve 94 and hold the valve stem 180 in an open position when the second fitting 144 is mounted to the tire valve 94. Removal of the second fitting 144 from the tire valve 94 may allow the valve stem 180 to move to a closed position to inhibit pressurized gas from flowing through the tire valve 94. For instance, the valve stem 180 may move right from the position shown in FIG. 2 such that the enlarged head at the left end of the valve stem 180 moves to the right and seals against the body of the tire valve 94. As such, the tire valve 94 may be open when the second fitting 144 is mounted to the tire valve 94 and the tire valve 94 may be closed when the second fitting 144 is not mounted to the tire valve 94.

The pressure relief valve 146 may be fluidly connected to the third port 164. The pressure relief valve 146 may be configured to open to vent pressurized gas from the cavity 96 of the tire 60 and/or the tire inflation system 110. For example, the pressure relief valve 146 may open to vent pressurized gas from the cavity 96 to the surrounding environment 104 when the pressure of the pressurized gas in the cavity 96 exceeds a threshold pressure. The threshold pressure may be greater than or equal to a desired or target tire inflation pressure in one or more embodiments and may account for tolerances associated with the valve design or a pressure range at which the pressure relief valve 146 may open. For instance, the pressure of pressurized gas in the tube 140 and the first fitting 142 may be substantially similar to the pressure in the cavity 96 when the tire valve 94 is open. As such, pressurized gas in the cavity 96 may flow through the tire valve 94, the tube 140, the first fitting 142 (by entering the second port 162 and flowing to the third port 164) and through the pressure relief valve 146 when the pressure of pressurized gas in the cavity 96 exceeds a threshold pressure at which the pressure relief valve 146 is configured to open. The pressure relief valve 146 may be closed when the pressure of pressurized gas in the cavity 96 does not exceed the threshold pressure. As such, the pressure relief valve 146 may not permit pressurized gas to exit the cavity 96 via the tube 140 and the first fitting 142 when the pressure relief valve 146 is closed. The pressure relief valve 146 may be disposed proximate and may be mounted to the first fitting 142 when the intermediate valve 148 is not provided. The threshold pressure for the pressure relief valve 146 may be substantially similar to the threshold pressure for the wheel pressure relief valve 100 in one or more embodiments. The pressure relief valve 146 may be provided with or in place of the wheel pressure relief valve 100 or vice versa in one or more embodiments. In addition, it is contemplated that the pressure relief valve 146 or pressure relief valve 146 and the intermediate valve 148 may be provided between the tube 140 and the tire valve 94, such as proximate the second fitting 144.

The pressure relief valve 146 may also vent pressurized gas from the tire inflation system 110 when the supply pressure, or pressure of pressurized gas that is provided to the first port 160 of the first fitting 142 exceeds the threshold pressure of the pressure relief valve 146. For instance, all or some of the pressurized gas provided to the first port 160 may be vented to the surrounding environment 104 via the pressure relief valve 146 when the supply pressure exceeds the threshold pressure. As such, the pressure relief valve 146 may be configured such that pressurized gas that is provided to the first port 160 from the pressurized gas source 112 may not be provided to the cavity 96 of the tire 60 when the supply pressure exceeds the threshold pressure. Alternatively, the pressure relief valve 146 may be configured such that most but not all of the pressurized gas that is provided to the first port 160 may be vented through the pressure relief valve 146 when the supply pressure exceeds the threshold pressure. As such, a volume a pressurized gas that is vented through the pressure relief valve 146 may exceed a volume of pressurized gas that is provided to the cavity 96 of the tire 60 when the supply pressure exceeds the threshold pressure to help inhibit overinflation of the tire 60. The pressure relief valve 146 and the wheel pressure relief valve 100 may both vent pressurized gas at the same time. The pressure relief valve 146 may be disposed proximate the first fitting 142 when the intermediate valve 148 is not provided.

The intermediate valve 148, if provided, may be disposed between the third port 164 and the pressure relief valve 146. For example, the intermediate valve 148 may be disposed proximate or may be received in the third port 164. The intermediate valve 148 may have any suitable configuration. For example, the intermediate valve 148 may be configured as a Schrader valve. The intermediate valve 148 may control the flow of gas through the third port 164, depending on whether the pressure relief valve 146 is present. For example, the intermediate valve 148 may move between an open position and a closed position. In the open position, pressurized gas may flow through the first fitting 142 and third port 164 to the intermediate valve 148 and through the intermediate valve 148 to the pressure relief valve 146. In the closed position, pressurized gas may not flow through the intermediate valve 148. The intermediate valve 148 may be held in the open position by the pressure relief valve 146. For example, the pressure relief valve 146 may actuate a valve stem 170 of the intermediate valve 148 and hold the valve stem 170 in an open position when the pressure relief valve 146 is mounted to the intermediate valve 148. Removal of the pressure relief valve 146 from the intermediate valve 148 may allow the valve stem 170 to move to a closed position to inhibit pressurized gas from flowing through the intermediate valve 148. For instance, the valve stem 170 may move upward from the position shown in FIG. 2 such that the enlarged head at the bottom of the valve stem 170 moves upward and seals against the body of the intermediate valve 148. As such, the intermediate valve 148 may be open when the pressure relief valve 146 is mounted to the intermediate valve 148 and the intermediate valve 148 may be closed when the pressure relief valve 146 is not mounted to the intermediate valve 148.

The tire inflation system and pressure relief valves described above may permit an associated tire to be passively deflated without sensors, controllers, or associated electronics. As such, pressurized gas may be vented from an overinflated tire in a cost-effective manner to help avoid accelerated or uneven tire wear or unfavorable ride or handling characteristics. Moreover, an overinflated tire may be automatically deflated without operator intervention or in response to an operator command. Moreover, the tire may be deflated while the vehicle is moving or in operation without waiting for the vehicle to stop. In addition, an intermediate valve that is associated with a pressure relief valve may permit an associated pressure relief valve to be removed or serviced with little pressurized gas leakage from the tire inflation system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A tire inflation system comprising:
 a tube assembly that provides pressurized gas to a tire, wherein the tube assembly includes:
 a tube having a first end and a second end;
 a first fitting that is disposed proximate the first end of the tube, wherein the first fitting has a first port that receives pressurized gas, a second port that provides pressurized gas to the tube, and a third port that is fluidly connected to the first port;
 a second fitting that is disposed proximate the second end of the tube and is coupled to a tire valve of the tire, wherein the second fitting holds the tire valve in an open position when the second fitting is coupled to the tire valve; and
 a pressure relief valve that is fluidly connected to the third port of the first fitting, wherein the pressure relief valve vents pressurized gas from the tire when a pressure of the pressurized gas in the tire exceeds a threshold pressure.

2. The tire inflation system of claim 1 wherein the pressure relief valve is closed when the pressure of the pressurized gas is less than the threshold pressure.

3. The tire inflation system of claim 1 wherein the pressure relief valve vents pressurized gas from the tire when the pressure of the pressurized gas in the tire exceeds a pressure of the pressurized gas provided to the first port.

4. The tire inflation system of claim 1 wherein the tube assembly is fluidly connected to a pressurized gas source that supplies the pressurized gas to the first port at a supply pressure, wherein the pressurized gas is vented through the pressure relief valve when the supply pressure exceeds the threshold pressure.

5. The tire inflation system of claim 4 wherein pressurized gas from the pressurized gas source is not provided to the tire when the supply pressure exceeds the threshold pressure.

6. The tire inflation system of claim 4 wherein a volume of pressurized gas that is vented through the pressure relief valve exceeds a volume of pressurized gas that is provided to the tire when the supply pressure exceeds the threshold pressure.

7. The tire inflation system of claim 1 wherein the first fitting is coupled to a rotary fitting that is mounted to a hub cap.

8. A tire inflation system comprising:
    a tube assembly that provides pressurized gas to a tire, wherein the tube assembly includes:
        a tube having a first end and a second end;
        a first fitting that is disposed proximate the first end of the tube, wherein the first fitting has a first port that receives pressurized gas, a second port that provides pressurized gas to the tube, and a third port that is fluidly connected to the first port;
        a second fitting that is disposed proximate the second end of the tube and is coupled to a tire valve of the tire;
        a pressure relief valve that is fluidly connected to the third port of the first fitting, wherein the pressure relief valve vents pressurized gas from the tire when a pressure of the pressurized gas in the tire exceeds a threshold pressure; and
        an intermediate valve disposed between the first port and the pressure relief valve.

9. The tire inflation system of claim 8 wherein the intermediate valve closes to inhibit pressurized gas from flowing through the third port when the pressure relief valve is removed from the intermediate valve.

10. The tire inflation system of claim 8 wherein the intermediate valve opens to permit pressurized gas to flow through the third port when the pressure relief valve is mounted on the intermediate valve.

11. The tire inflation system of claim 8 wherein the second fitting holds the tire valve in an open position when the second fitting is coupled to the tire valve.

12. A tire inflation system comprising:
    a pressurized gas source that supplies pressurized gas to a tire; and
    a wheel upon which the tire is mounted, wherein the wheel includes:
        a first opening that receives pressurized gas from the pressurized gas source;
        a second opening;
        a wheel pressure relief valve that is disposed proximate the second opening, wherein the wheel pressure relief valve opens to vent pressurized gas from inside the tire to a surrounding environment when a pressure of pressurized gas in the tire exceeds a threshold pressure; and
        an intermediate wheel valve disposed proximate the second opening, wherein the intermediate wheel valve is open when the wheel pressure relief valve is mounted to the intermediate wheel valve and wherein the intermediate wheel valve is closed when the wheel pressure relief valve is not mounted to the intermediate wheel valve.

13. The tire inflation system of claim 12 wherein the wheel pressure relief valve is closed when the pressure of pressurized gas in the tire does not exceed the threshold pressure.

14. The tire inflation system of claim 12 wherein the first opening is spaced apart from the second opening.

15. The tire inflation system of claim 12 wherein the wheel has a wheel mounting flange and wherein the first opening is disposed on an opposite side of the wheel mounting flange from the second opening.

16. The tire inflation system of claim 12 wherein the wheel pressure relief valve vents pressurized gas from inside the tire to the surrounding environment when pressurized gas is provided to the tire via the first opening.

17. The tire inflation system of claim 12 wherein the pressurized gas source is fluidly connected to a tire valve that is disposed in the first opening via a tube assembly.

18. The tire inflation system of claim 17 wherein the tube assembly includes a first fitting that receives pressurized gas from the pressurized gas source and that has a second port that is fluidly coupled to a tube that provides pressurized gas to the tire valve, a third port, and a pressure relief valve that is fluidly connected to the third port, wherein the pressure relief valve vents pressurized gas from the tire when the pressure of pressurized gas in the tire exceeds the threshold pressure.

19. The tire inflation system of claim 18 wherein the wheel pressure relief valve and the pressure relief valve of the tube assembly both vent pressurized gas from the tire when the pressure of the pressurized gas in the tire exceeds the threshold pressure.

* * * * *